United States Patent [19]

Wood et al.

[11] 3,871,968

[45] Mar. 18, 1975

[54] MULTISTAGE EVAPORATORS

[75] Inventors: Frank Chiltern Wood, Broadstone; Allan Barker, Chester, both of England

[73] Assignee: United Kingdom Atomic Energy Authority, London, England

[22] Filed: Apr. 16, 1973

[21] Appl. No.: 351,546

[30] Foreign Application Priority Data
Apr. 21, 1972 Great Britain.................... 18703/72

[52] U.S. Cl................ 202/173, 202/174, 203/7, 203/11, 203/DIG. 8, 203/DIG. 20, 203/73, 203/88
[51] Int. Cl........................... B01d 1/26, C23f 17/00
[58] Field of Search............... 203/7, 11, 26, 34, 35, 203/88, 73, DIG. 20, DIG. 8, DIG.16; 202/173, 174

[56] References Cited
UNITED STATES PATENTS

| | | | |
|---|---|---|---|
| 3,021,265 | 2/1962 | Sadtler et al...................... | 202/174 |
| 3,135,670 | 6/1964 | Ristaino et al.......................... | 203/7 |
| 3,218,241 | 11/1965 | Checkovich............................ | 203/7 |
| 3,245,883 | 4/1966 | Loebel................................. | 203/7 |
| 3,334,023 | 8/1967 | Fritz..................................... | 202/173 |
| 3,344,041 | 9/1967 | Wulfson............................... | 202/173 |
| 3,389,059 | 6/1968 | Goeldner.............................. | 203/7 |
| 3,476,654 | 11/1969 | Sieder................................... | 203/88 |
| 3,607,668 | 9/1971 | Williamson.......................... | 202/173 |
| 3,649,469 | 3/1972 | MacBeth...................... | 203/DIG. 20 |
| 3,681,920 | 8/1972 | Margen................................ | 202/173 |

Primary Examiner—Wilbur L. Bascomb, Jr.
Attorney, Agent, or Firm—Larson, Taylor & Hinds

[57] ABSTRACT

To reduce the deposition of scale on to evaporator surfaces, acid is usually added to the feed liquid in stoichiometric proportions. An economy is effected by dividing the feed stream into a first portion which passes to the high temperature stages of a multistage plant after acid treatment and a second portion which avoids the high temperature stages and hence requires less severe treatment for the prevention of scaling.

8 Claims, 4 Drawing Figures

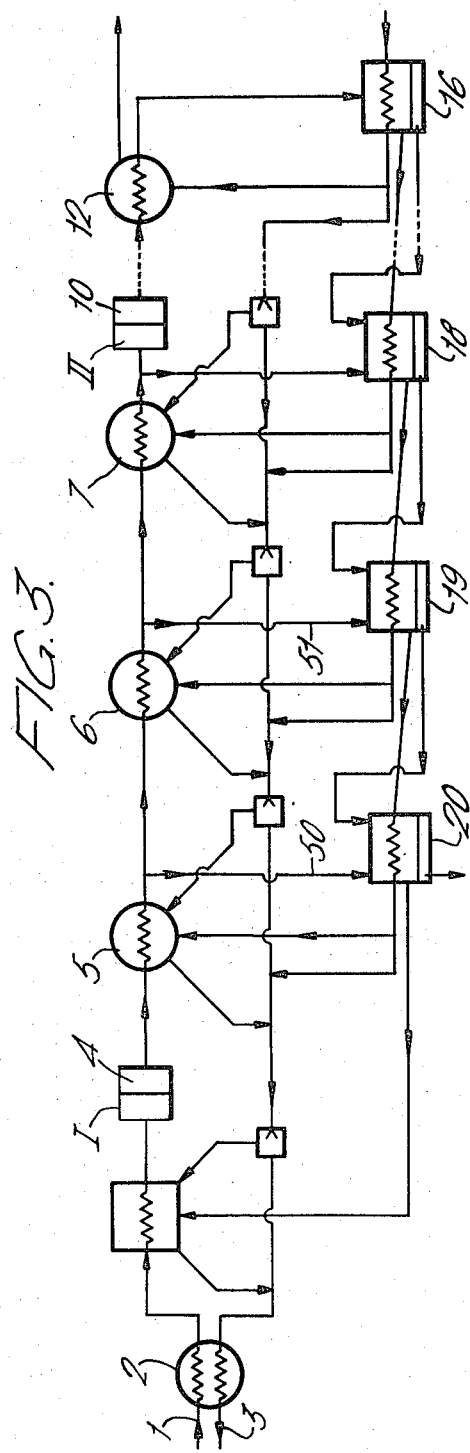

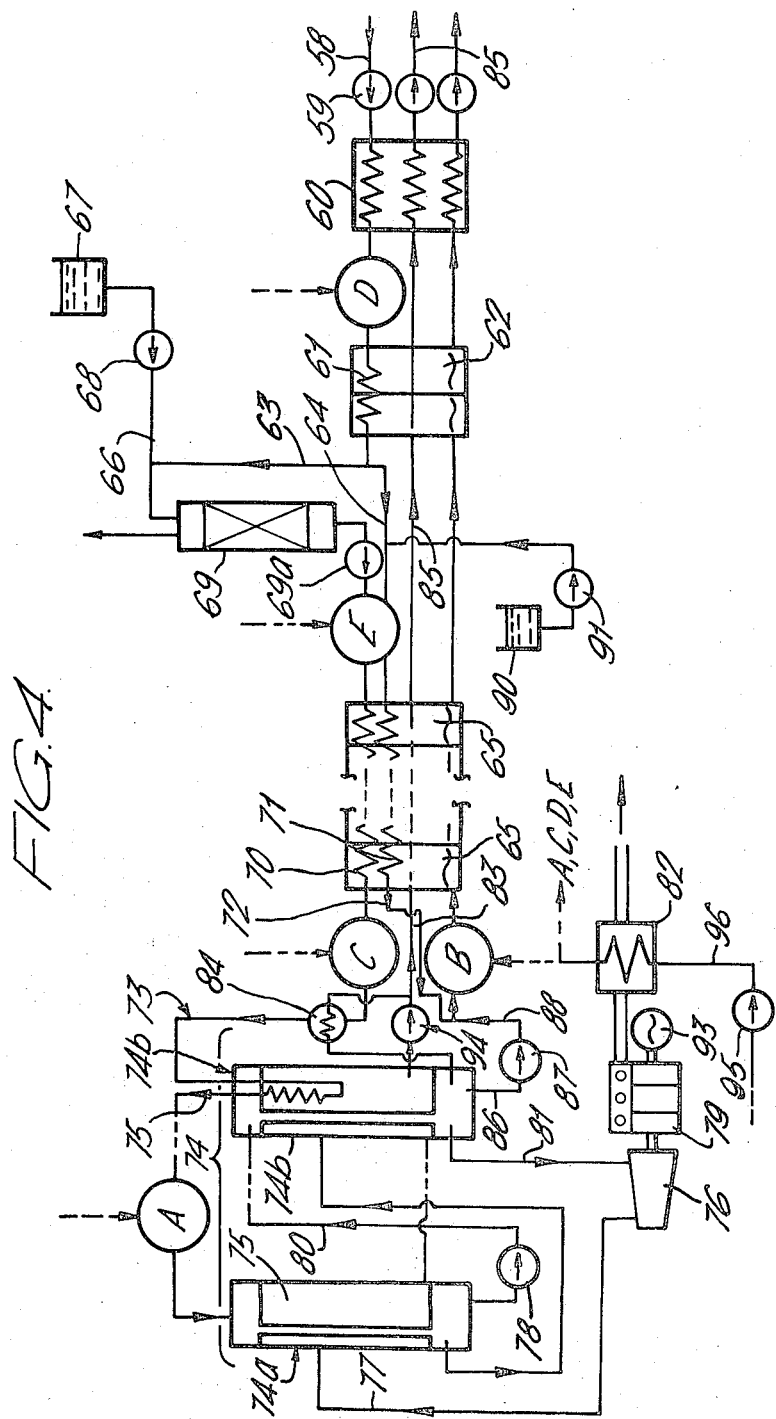

3,871,968

MULTISTAGE EVAPORATORS

BACKGROUND OF THE INVENTION

This invention relates to multistage evaporator plant for use with liquids which are liable to deposit scale on those surfaces of the plant with which liquid or its vapours come into contact. It will be known that the scaling of evaporator surfaces may be reduced or eliminated either by running the plant at a temperature below the scaling temperature of the liquid, although this will vary with solute concentration, or by running the plant within a temperature range which includes scaling temperatures and adding scale inhibiting additives to the liquid. The latter of these alternatives is usually to be preferred even though an economic penalty due to the cost of additive substances is incurred.

It has previously been proposed to treat all the feed water of a plant with polyphosphates whilst the water is at a low temperature, then to heat the treated water to about 200°F. Acid, a high temperature treatment additive is then mixed with the whole. Thus the whole of the feed is treated with both additive types.

It has also been proposed to treat all the feed water of a plant at a low temperature with acid, then to preheat the treated feedwater. Acid treatment in this sense provides for both high and low scale inhibiting additive for alkaline scale limitation. After feed preheating the feed is subjected to flocculation to inhibit sulphate scale. A secondary scaling is usually avoided by imposing operational restraints and is not normally a problem of concern. In this context the invention aims at a reduction in the use of said additive.

The present invention aims to provide a multistage evaporator plant in which the aforesaid economic penalty is reduced.

SUMMARY OF THE INVENTION

According to the present invention, a multistage evaporator plant arranged to operate with a feed liquid and within a range of temperatures wherein scale may form on the evaporator surface includes conduit means for dividing the feed liquid into a number of streams for supply to stages where different temperatures prevail and scale control treatment means for treating the streams separately and in accordance with the temperatures prevailing in said stages. The conduit means may divide the feed liquid into two streams and by directing one stream into stages where relatively low temperatures prevail may provide different scale control treatments for the respective streams. One of these is taken to the maximum feed temperature after suitable treatment to control high temperature scaling, the other having been treated with an additive for control of lower temperature scaling is is supplied to supplement the feed to a stage at an appropriately lower temperature.

In one aspect, therefore, a multi-stage evaporator is a multi-effect plant having a number of evaporator stages operating at progressively lower temperatures and pressures through which feed is passed, a heat input section for raising feed to the temperature of the highest temperature stage, a preheater for preheating the feed en route to said heat input section, means for diverting a portion of the feed from a part of the preheater at a temperature below said highest temperature into a stage of the evaporator at a corresponding temperature, the plant including separate feed treatment plants for treating with different scale inhibitors the portion of the feed to be taken to the highest temperature stage of the plant and for treating the diverted portion.

The feed liquid stream may be divided near entry, e.g. upstream of the preheater, into two portions, one portion being treated with low temperature scale deposition inhibitor and means being provided for feeding said one portion to feed those effects of the plant where high temperature scale deposition is not a problem whilst the other portion is treated with a high temperature scale deposition inhibitor and fed into the higher temperature effects subject to high temperature scaling.

In a modified form, the multieffect plant may inclued a preheater chain which progressively preheats the feed entering the plant, the plant being treated as a whole on entry with an inhibitor against low temperature scale deposition and being split after a degree of preheating at a temperature, below that at which the same inhibitor becomes of reduced effectiveness, into two streams, of which one is fed into an effect as part of its feed where a corresponding temperature condition obtains and the other is treated with a high temperature scale inhibitor and thereafter brought to the highest temperature of the plant. Where a multieffect plant is employed, this may be coupled with vapour compression the compressor of which is driven by a heat engine having a waste heat boiler. Steam from the boiler, and, heat from cooling water, may be fed back into the evaporator plant at selected positions in the cycle.

According to this aspect of the invention there is provided a hybrid multieffect vapour compression evaporator plant comprising a multieffect evaporator, a vapour compressor, a heat engine drivingly connected to the vapour compressor, a waste heat boiler associated with the heat engine, conduits communicating the suction inlet of the compressor with one of the effects of the multieffect evaporator operating on feed liquid at a temperature below the highest temperature and communicating the outlet of the compressor with the first effect at highest temperature, means for dividing the feed flow in the preheater line at a temperature below scaling temperature into two streams, means for treating a first stream with high temperature scale inhibitor, means for treating a second stream with low temperature scale inhibitor, means feeding the first stream to a multieffect evaporator and means feeding the second stream to a multistage flash evaporator condenser arranged to operate on concentrate from the multieffect evaporator.

As will be appreciated, the economic penalty of employing scale inhibiting additives may be reduced by thus providing, for a portion of the feed, a mere threshold treatment which entails the use of a relatively cheap additive in reduced proportion, as compared with the high temperature scale inhibitor, which can be relatively expensive and can be required in comparatively generous proportions.

Suitable additives for control of scale within a limited lower temperature range are mixtures containing polyphosphate compounds such as those marketed under the trade name HAGEVAP. High temperature scale inhibitors are acids such as sulphuric acid.

DESCRIPTION OF THE DRAWINGS

In order that the invention may be better understood four plants embodying the invention will now be described with reference to the following drawing in which
FIG. 3 is a diagram showing a modified form of FIG. 1
and
FIG. 4 is a diagram showing a hybrid evaporator plant employing both multieffect and vapour compression techniques.

DESCRIPTION OF THE PREFERRED EMBODIMENTS

Briefly stated, each embodiment comprises a multistage evaporator plant comprising an inlet 1 for feed liquid, a chain of liquid preheater compartments (16-20) interconnected with one another and with the inlet by pipe connections, and a feed liquid heater 13, the heater having an inlet and an outlet conduit communicating the chain of liquid preheaters with the heater inlet and communicating the heater outlet with an evaporator compartment. The pipe connections include a branch pipe 22 connecting the preheater chain with the one of the evaporator compartments. Each embodiment further comprises a high temperature scale inhibiting treatment plant II, pipe work connecting the high temperature scale inhibiting additive treatment plant with a location in the preheater chain between the branch pipe 22 and the heater 13 and a low temperature scale inhibiting treatment plant I connected to treat at least feed liquid by-passing the heater.

Figure 1:
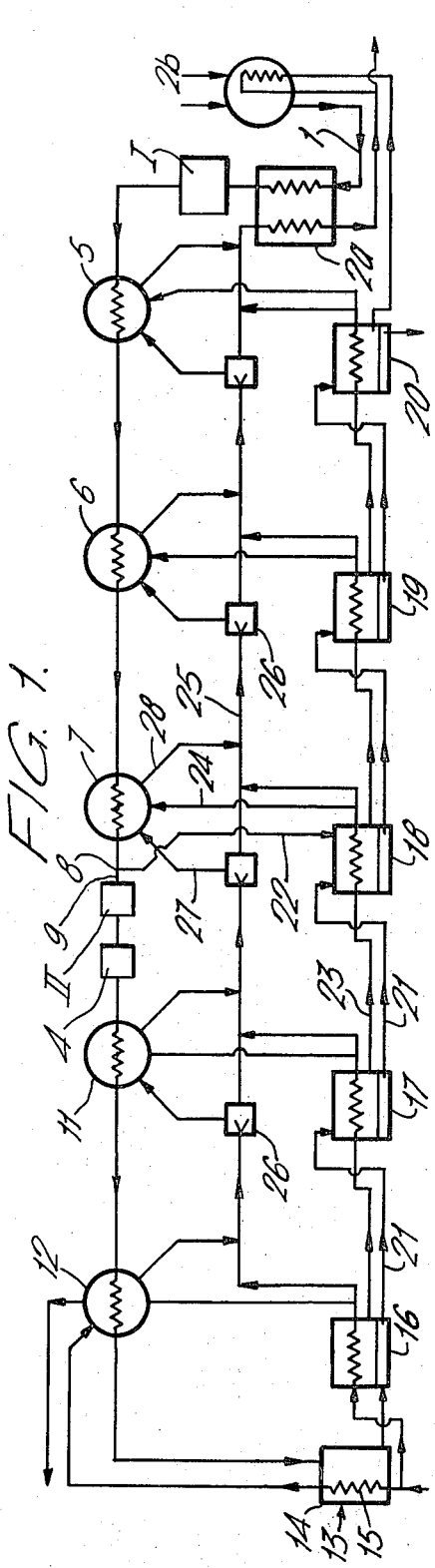
FIG. 1 is a diagram of a multieffect evaporator plant.

Referring firstly to FIG. 1 seawater feed enters the plant via pipe 1, and is raised in temperature by passage in heat exchanger 2a with warm condensate leaving the plant via pipe i.e. and by passage through condenser 2b. The feed is then passed through a chemical treatment plant I where it is treated with an additive which can restrict scale deposition up to temperatures of about 190°F. The treated feed is heated in preheater chain 5, 6, 7 by vapour from the evaporator effects until, at point 8, the temperature of about 190°F is approached. Here the feed is split and that intended for further heating passes via line 9 to chemical treatment plant II where the feed liquid is mixed with acid, ie high temperature scale inhibitor, in sufficient proportion to inhibit scale deposition at temperatures up to the maximum temperature of the plant. The acidtreated feed is heated to this temperature, after degassing at 4 and further preheating in preheaters 11, 12, in a heater 13 which comprises a vessel 14 whose contents is heated by a steam coil 15. The heated feed is then fed to the first effect 16 of a multieffect evaporator the effects of which are referenced consecutively 16 to 20.

Returning now to the point 8 where the feed is split, the portion of the feed divided from the preheater chain is fed directly by branch pipe 22 to an effect of the evaporator whose feed temperature corresponds to that of the divided portion of the feed, i.e., just below 190°F. Such an effect is, in this example, effect 18 and the divided portion of the feed from the preheater supplements the feed from effect 18 for evaporation in effect 19. The unevaporated portion from the evaporator follows the evaporator line 21 down the plant.

The operation of the evaporators is for the most part conventional, each effect receiving as its feed the unevaporated portion of liquid from the previous effect via line 21 and, within each effect, the feed is heated by condensing vapour raised in the previous effect. The evaporated portion of the feed passes via line 23 to the next effect, the unevaporated portion passes via line 21 to the next effect whilst the partly condensed heating fluid passes in part to the condensate line 25 and in part to the adjacent preheater via line 24. The condensate line 25 incorporates flash chambers 26 in which flash steam is produced from condensate using the pressure drop between effects and this steam is used as the heating medium for the preheater chain being delivered to each preheater by line 27 where it condenses and the condensate returned by line 28 to the condensate main 25.

In this process the whole feed is treated with low temperature scale inhibitor in plant I but only a proportion receives acid treatment in plant II and this represents a substantial saving in acid usage. Although five effects only are illustrated no special significance is put upon the number of effect, there may in fact be any number. Also flashing of feed liquid between effects in line 21 may be carried out as in conventional systems.

Figure 2:
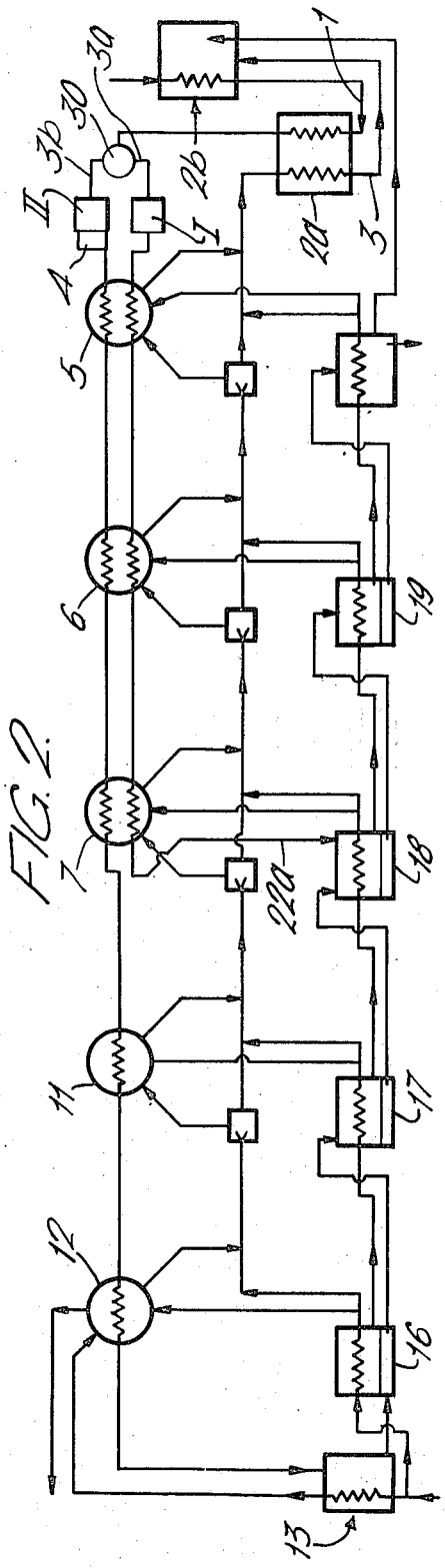
FIG. 2 is a diagram of a variant of the plant shown in FIG. 1.

FIG. 2 shows a modified form of multieffect evaporator where the parts corresponding to those in FIG. 1 bear the same reference numerals. In the plant of FIG. 2 the seawater feed is split downstream of the heat exchanger 2a into two streams 3a and 3b the proportions being controllable by manipulation of valve 30.

The stream 3a which is to form part of the feed for the low temperature stages of the evaporator, where the operating temperature is below 190°F, is passed through a chemical treatment stage I where it is dosed with an additive for inhibiting the deposition of hard scale at low temperatures. The proportion of the feed so treated is passed through the first three preheaters only wherein it is heated to a temperature below the limit at which the additive ceases to be effective. At this point in the preheater chain the feed temperature is appropriate for entry as feed liquid into the evaporator effect 18 via line 22a.

The proportion of the feed in stream 3b is mixed with an acidic additive in treatment plant II and passed through the whole preheater chain after degassing at 4 but is kept separate from the feed from treatment plant I, during its passage through preheaters 5, 6, and 7. After leaving the final preheater 12 the feed enters the heater 13 and having been heated therein, passes into the first effect 16 of the evaporator chain.

This modified plant possesses the advantage over that of FIG. 1 in that only a proportion of the feed liquid is passed through treatment plant I so making a saving of low temperature scale inhibiting agent used per pound feed liquid, the acid treatment provided by plant II being effective against both low and high temperature scale deposition.

The layout shown in FIG. 3 uses the disposition of plants I and II as shown in FIG. 1, i.e. the whole feed liquid is treated with low temperature scale inhibitor and only a proportion thereof treated with acid, i.e. high temperature scale inhibitor. However the variant shown in FIG. 2 may equally well be used. In FIG. 3 the seawater feed is admitted to the plant via pipe 1, passes through heat exchanger 2 where it gains heat from the condensate product leaving the plant via line 3 and after initial preheating enters chemical treatment plant I. After treatment with additives to inhibit low temperature scale, the feed is deaerated in deaerator 4 and enters the preheater chain. In the first preheater the seawater is raised i.e. a temperature approaching temperature of the final effect feed and a controlled proportion of it is bled off through pipe 50 to join the feed to the final evaporator. The remainder of the feed from preheater 5 passes to preheater 6 where it undergoes a further temperature rise so that, on leaving the preheater, a proportion may be diverted in to the penultimate effect via pipe 51 instead of passing to the next preheater 7 with the main stream. The same procedure is applied with the feed leaving preheater 7 but at the exit of this preheater the feed temperature approaches the limit of effectiveness for the low temperature sealing additive and further treatment is necessary before the feed proceeds further. Hence the feed here enters the treatment plant II and having received doses of a high temperature scale inhibitor, i.e. acid, the feed is degassed in deaerator 10 and delivered into preheater 8.

The remainder of the plant is similar to that described above but after each preheater a proportion of the feed is diverted into an adjacent effect at a corresponding temperature in a manner similar to that described in effects 5, 6 and 7 in FIG. 3.

Considering the case of a seawater desalting plant having a feed system shown in FIG. 2 but with 16 effects and rejecting brine at a concentration of 2.7X seawater, a useful cost saving in product can be shown as compared with the conventional feed treatment entailing uniform acid dosing of the entire feed. For example, in such a plant, with the low temperature scale deposition inhibitor costing about 200/ton and used in treatment plant I (FIG. 2) at a rate of 3ppm and the high temperature scale deposition inhibitor (acid) costing about 25/ton and used in treatment plant II (FIG. 2) at a rate of 110 ppm (ie near to stoichiometry), the saving is about 0.56p/Kgal. If the acid were to cost 50/ton as in some locations, then the saving would be of the order of 1.30p/Kgal of potable water product.

If the same conditions were applied to FIG. 1 where the whole feed is treated with low temperature scale deposition inhibitor, the corresponding savings would be less, at an estimated 0.29 or 1.03 p/Kgal according to the cost of acid. Nevertheless there is the additional advantage that less of the surface of the preheaters comes into contact with acid treated seawater than in a conventional plant where acid treatment is effected at the start of the preheater chain. Thus corrosion problems are reduced.

FIG. 4 shows a further application of the invention to a hybrid multi-effect/vapour compression evaporator plant in which the heat input sections are indicated in descending order of temperature by large case letters A to E contained in circles. Sea-water is drawn into the plant via line 58 by a pump 59 and acquires heat from three separate heat exchangers through which the water is passed in series. The heat exchangers comprises a surface heat exchanger 60, a heat input section D and condenser tubes 61 of a multi-stage flash evaporator preheater 62. At the exit of the tubes 61, the warmed sea-water flow is divided between a line 63 and a line 64. The portion entering line 63 is destined for the highest temperature reaches of the plant and undergoes acid dosing in stoichiometric proportions whilst that in line 64 will not be raised beyond a relatively lower temperature and is treated with phosphoric additive in minor amounts.

Following firstly the proportion of feed in line 63, it will be seen that acid from a tank 67 is passed by a metering pump 68 along line 66 into line 63 and the acid dosed feed passed immediately into a degassing apparatus 69 to remove gases evolved as a result of acid additions. The degassed liquid is pumped by pumps 69a through heat input stage E into condenser tubes 70 which extend through the compartments of a second multi-stage flash preheater 65.

Referring back to the other portion of the feed emerging from pipe 61, this enters line 64 where it mixes with low temperature scale inhibitor contained in a tank 90 and supplied by a metering pump 91. Feed with its additive passes through heat input section E into condenser pipes 71 of the multistage flash preheater 65. From condenser pipes 71 the low temperature feed passes into pipe 72 into heat input section B where it is raised to 190°F and from B passes as feed liquor into the multistage flash preheater 65.

The high temperature feed passes from condenser tubes 70 in the preheater 65 into heat input section C and thence via preheater 94 and line 73 to a multistage multi-effect evaporator 74. The evaporator 74 is shown here as an LTV type but in fact any other kind of multieffect evaporator may be used eg HFF. The latter has a number of stages but only the first 74a and last 74b are shown. The feed in line 73 passes first in heat exchange with condensate from the evaporator 74 in heat exchanger 84 and enters the preheater/condenser line 75. From the high temperature and of the line 75, the feed passes through heat input section A and thence enters the header box of the first effect 74a. The LTV evaporator is conventional in that the feed flows down the bore of vertical tubes whilst the tube exteriors are heated by condensing vapour. In this case the heating vapour for use in the first effect 74a comes from the final effect 74b via a vapour compressor 76 which raises the vapour temperature by compression. The evaporated portion of the feed in evaporator effect 74a is piped into the next lower effect as heating vapour via line 77 whilst the unevaporated portion is pumped by pump 78 into the header box of the next lower effect. The condensed heating vapour passes down the evaporator from stage to stage via suitable throttling devices and is pumped via pump 94 into a condensate main 85. The latter collects condensate from the LTV evaporator and the flash evaporators 65 and 62 and the total is cooled in heat exchanger 60 before being pumped into product tanks. Reject vapour from the final effect 74b is condensed in condensor 94 and the condensate delivered to main 85.

From the LTV evaporator, the concentrate liquor from the lowest effect 74b passes into line 86 and is pumped by pump 87 into a common line 88 through heat input section B in common with the first portion of the feed in line 72. As stated, the heated feed from heat input section B passes into multistage flash preheater 65 serving to preheat feed in condenser tubes 70, 71. The concentrate from the plant 65 is flashed again in preheater 62 before passing through surface heat exchanger 60 and finally pumped to waste. The condensate from preheat 65 is delivered into condensate main 85 which passes through heat exchangers 62 and 60.

The vapour compressor 76 is driven by a gas turbine 79 which may be of such a size as to produce power from alternator 93 as well as to drive the vapour compressor 76. The heat available from such a machine after supplying shaft power is sufficient to serve all heat input sections A-E, and to this end the exhaust gases heat feedwater pumped by pump 95 through line 96 into waste heat boiler 82 to raise steam for use at some or all of points A, B, C, D, E.

The vapour compressor 76 may be driven by a diesel engine instead of a gas turbine. From the jacket and/or exhaust gases of the engine heat is recovered and used in the distillation process by heat exchanger with the feed to the multieffect LTV plant 74 and the multistage flash preheaters at the locations indicated A, B etc. The arrangement is such that the recovered heat is used at as high a temperature as possible. Thus, in the case of diesel engine the exhaust heat would be utilised at A, and the jacket heat at B or C and E, the lubricating oil heat at D. The embodiment of FIG. 4 finds more advantageous application in the case of a gas turbine driven compressor especially where the gas turbine is of a size to export power as in FIG. 4, and where the heat potentially available for use in the process is many times greater than it is in the case of the diesel engine. In particular, the exhaust heat available is greater than the process could absorb at section A and heat input section B provides a useful outlet for this heat.

We claim:

1. A multistage evaporator plant comprising an inlet for feed liquid, a chain of liquid preheaters interconnected with one another and with the inlet by pipe connections, a feed liquid heater, a number of evaporator compartments interconnected in series, conduits for communicating the chain of liquid preheaters with the heater inlet and for communicating the heater outlet with an evaporator compartment, said pipe connections including a branch pipe connected to bypass the heater and direct feed liquid to one of the evaporator compartments, a high temperature scale inhibiting treatment plant, pipe work connected to the high temperature scale inhibiting additive plant and a portion in the preheater chain between the branch pipe and the heater, and a low temperature scale inhibiting treatment plant for treating at least the feed liquid bypassing the heater.

2. A multistage evaporator plant as claimed in claim 1 in which the liquid preheater chain comprises a series of surface condenser heat exchangers for condensing vapors raised in an adjacent stage of the evaporator.

3. A multistage evaporator plant as claimed in claim 1 in which the low temperature feed treatment plant is connected at the inlet to the feed preheaters, the branch pipe is located at an intermediate position along the preheater chain and the high temperature feed treatment plant is connected into the preheater chain between the branch pipe and the heater.

4. A multistage evaporator plant as claimed in claim 1 in which the branch pipe is located at the end of the preheater chain adjacent the feed liquid inlet and the high and low temperature scale inhibiting additive treatment plants are connected between the branch pipe and the said preheaters.

5. A multistage evaporator plant as claimed in claim 1 including a heater for raising the feed liquid to the highest temperature stage of the plant, a preheater for preheating the feed, and conduit means for diverting a portion of the feed from a part of the preheater at a temperature below said highest temperature into a stage of the evaporator at a corresponding temperature, the plant including separate feed treatment facilities for treating with different scale inhibitors the diverted portion of the feed and the portion of the feed at the highest temperature of the plant.

6. A multistage multieffect evaporator comprising a plurality of interconnected stages which operate at progressively lower temperatures and pressures, a plurality of preheater heat exchangers at least some of which are associated with said stages, a first feed treatment facility for treating feed with a first additive effective to inhibit scaling under the conditions prevailing in some stages operating at temperatures below the highest temperature of the plant; a second feed treatment facility for treating feed with a second additive effective to inhibit scaling under conditions prevailing in the stages including those operating at the highest temperature of the plant, conduit means for directing feed from the preheater heat exchangers to lower temperature stages of the plant through the first feed treatment facility and means for directing feed from the preheater heat exchangers to higher temperature stages through the second feed treatment facility.

7. A combination multieffect vapour compression evaporator plant comprising a multieffect evaporator, a vapour compressor, a heat engine drivingly connected to the vapour compressor, a waste heat boiler associated with the heat engine, conduits for communicating the suction inlet of the compressor with one of the effects of the multieffect evaporator operating on feed liquid at a temperature below the highest evaporator temperature and for communicating the outlet of the compressor with the effect of the multieffect evaporator operating at said highest temperature, a preheater line, means for dividing the feed flow in the preheater line at a temperature below scaling temperature into first and second streams, means for treating the first stream with high temperature scale inhibitor, means for treating the second stream with low temperature scale inhibitor, means for feeding the first stream to said multieffect evaporator and means for feeding the second stream to a multistage flash evaporator condenser arranged to operate on concentrate from the multieffect evaporator.

8. A combination multieffect vapour compression evaporator plant comprising a gas turbine drivingly connected to a compressor, a multieffect evaporator, a duct connecting the compressor inlet with a source of vapour in one of the effects of the multieffect evaporator below the highest effect, a duct connecting the compressor delivery with a heating chamber in the highest effect, a feed inlet, a feed preheater connected to said feed inlet and comprising a multistage flash evaporator, condenser tubes extending within the stages of the flash evaporator, a connection between the feed inlet and said condenser tubes, duct means for conveying feed from the condensor tubes to a feed treatment plant as scaling conditions are approached, said feed treatment plant including a high temperature scale inhibitor section and a lower temperature scale inhibitor section, means for conveying a portion of the feed through the low temperature scale inhibitor section to the feed inlet of the multistage flash evaporator and a portion of the feed through the high temperature scale inhibitor section to the high temperature effect of the multieffect evaporator for evaporation therein and heat input sections which employ heat rejected by the gas turbine at the feed inlets of the multieffect evaporator and of the multistage flash evaporator.

* * * * *